July 14, 1925.

W. J. HAGMAN

MILLING MACHINE

Filed Oct. 7, 1921

Inventor
W. J. Hagman
By Lawrence Webster
Attorney

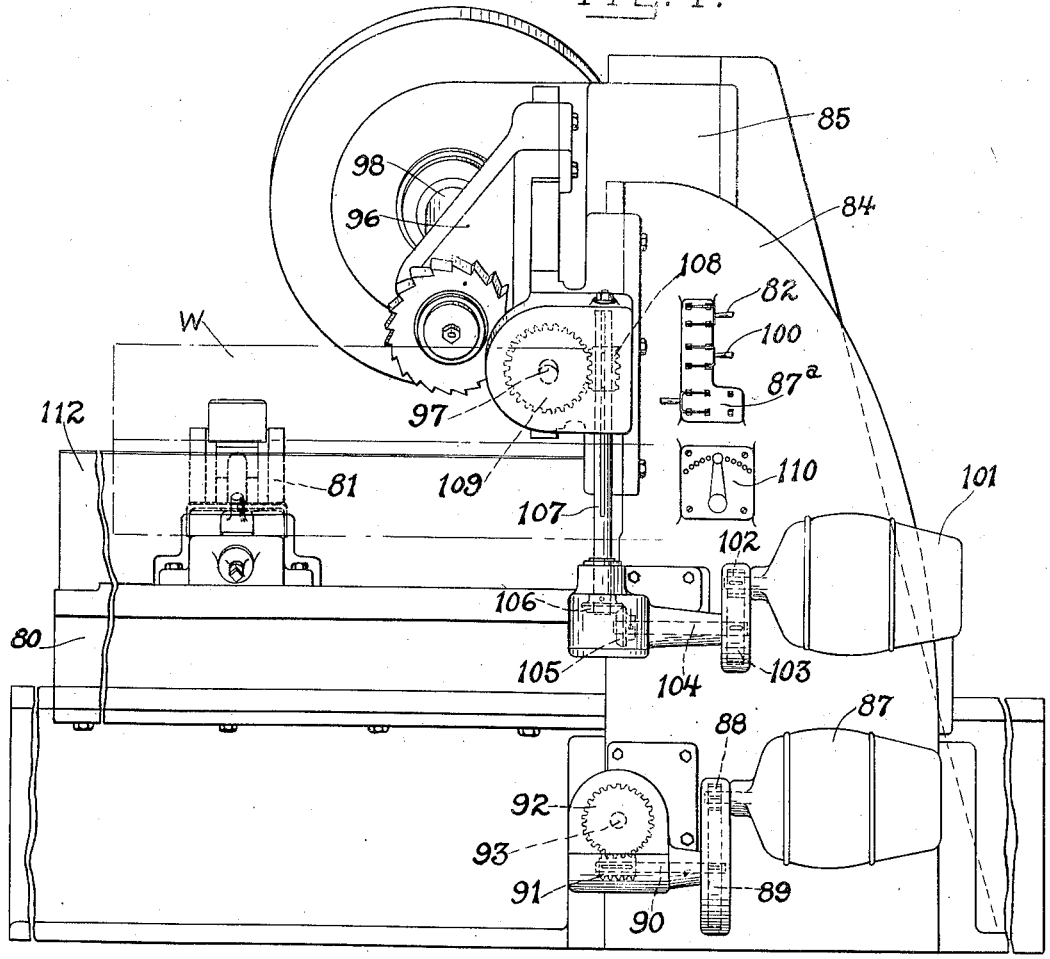

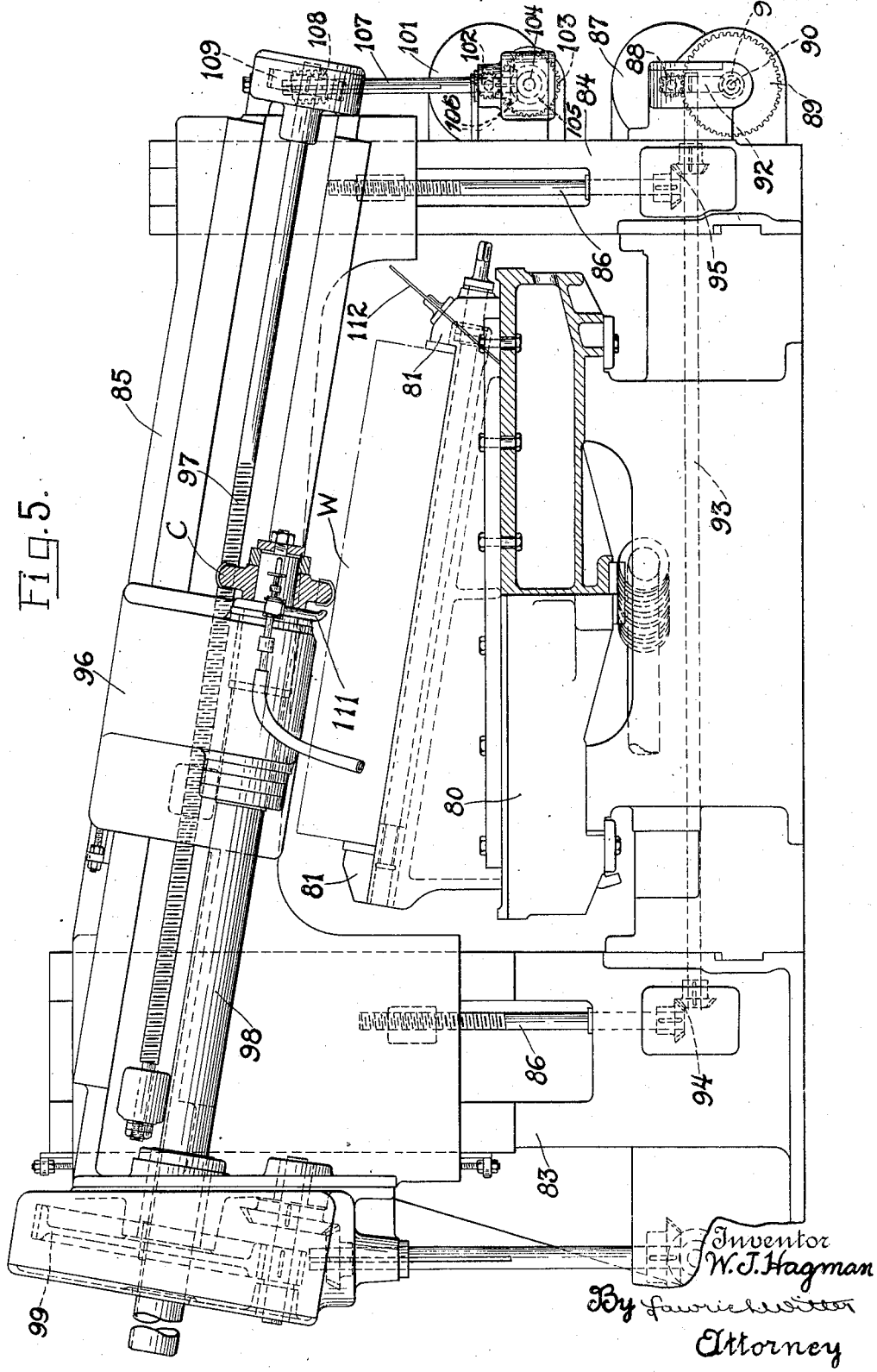

Patented July 14, 1925.

1,545,763

UNITED STATES PATENT OFFICE.

WILLIAM J. HAGMAN, OF PHILADELPHIA, PENNSYLVANIA, ASSIGNOR TO NILES-BEMENT-POND COMPANY, OF NEW YORK, N. Y., A CORPORATION OF NEW JERSEY.

MILLING MACHINE.

Application filed October 7, 1921. Serial No. 506,008.

*To all whom it may concern:*

Be it known that I, WILLIAM J. HAGMAN, a citizen of the United States, residing at Philadelphia, in the county of Philadelphia and State of Pennsylvania, have invented certain new and useful Improvements in Milling Machines, of which the following is a specification.

This invention relates to milling machines and particularly to bloom or billet millers. Billets which have been sheared from a rolled bar of steel have surface imperfections comprising cracks or seams which must be removed before the billet can be used for manufacturing purposes. Heretofore, this operation has been performed by a laborious hand chipping process with an expenditure of much time and expense. The present invention aims to provide a milling machine for rapidly performing this operation in an improved manner at a great saving of time and expense. It is an object of the invention, therefore, to provide a milling machine for the purpose stated wherein are provided work and tool supports, power means for causing relative movements between the tool and work, including power means, and controlling means therefor whereby the operator may easily and conveniently guide the tool over any portion of the surface of the work to mill out the imperfections therein.

It is a further object of the invention to provide a machine of the above type wherein is a reciprocating work table, an upright at one side of the table, preferably slightly inclined to the vertical and supporting a tool spindle for vertical adjustment thereon, and power means controlled by the operator for moving the spindle transversely of the table in either direction at different speeds during the table reciprocation, the said power means preferably being an electric motor as illustrated in the accompanying drawings.

Another object of the invention is to provide an improved form of work table and means in connection therewith for readily disposing of cutting fluid and chips flowing from the work and tool.

With these and other objects in view, my invention consists in the features of construction and operation set forth in the following specification and illustrated in the accompanying drawings. In such drawings annexed hereto and forming a part of this specification, I have shown certain embodiments of my invention but it will be understood that the invention can be otherwise embodied and that the drawings are not to be construed as defining or limiting the scope of the invention; the claims appended to this specification being relied upon for that purpose.

Referring to the figures of the drawings:

Fig. 4 is a front elevation of a modified form of the invention.

Fig. 5 is an end elevation thereof.

The accompanying drawings illustrate certain embodiments of my invention which broadly comprises a work support and a tool support with means for relatively reciprocating such supports and for relatively feeding the cutter and work to the proper cutting depth. Power means, preferably in the form of the electric motor illustrated, is provided for feeding the cutter transversely of the work, such means being entirely under the control of the operator whereby the latter may cause the cutter to move in either direction preferably longitudinally of the cutter spindle at different speeds. For the purpose of more clearly exposing the surface of the work to the view of the operator in order that he may properly guide the cutter, and for the purpose of assisting in removing chips from the work, I have shown the work and the several parts of the machine operative thereon as slightly inclined. It will be readily understood, however, that this and other details of the invention may be considerably modified within the scope of the appended claims without departing from the spirit of the invention.

Figure 1:
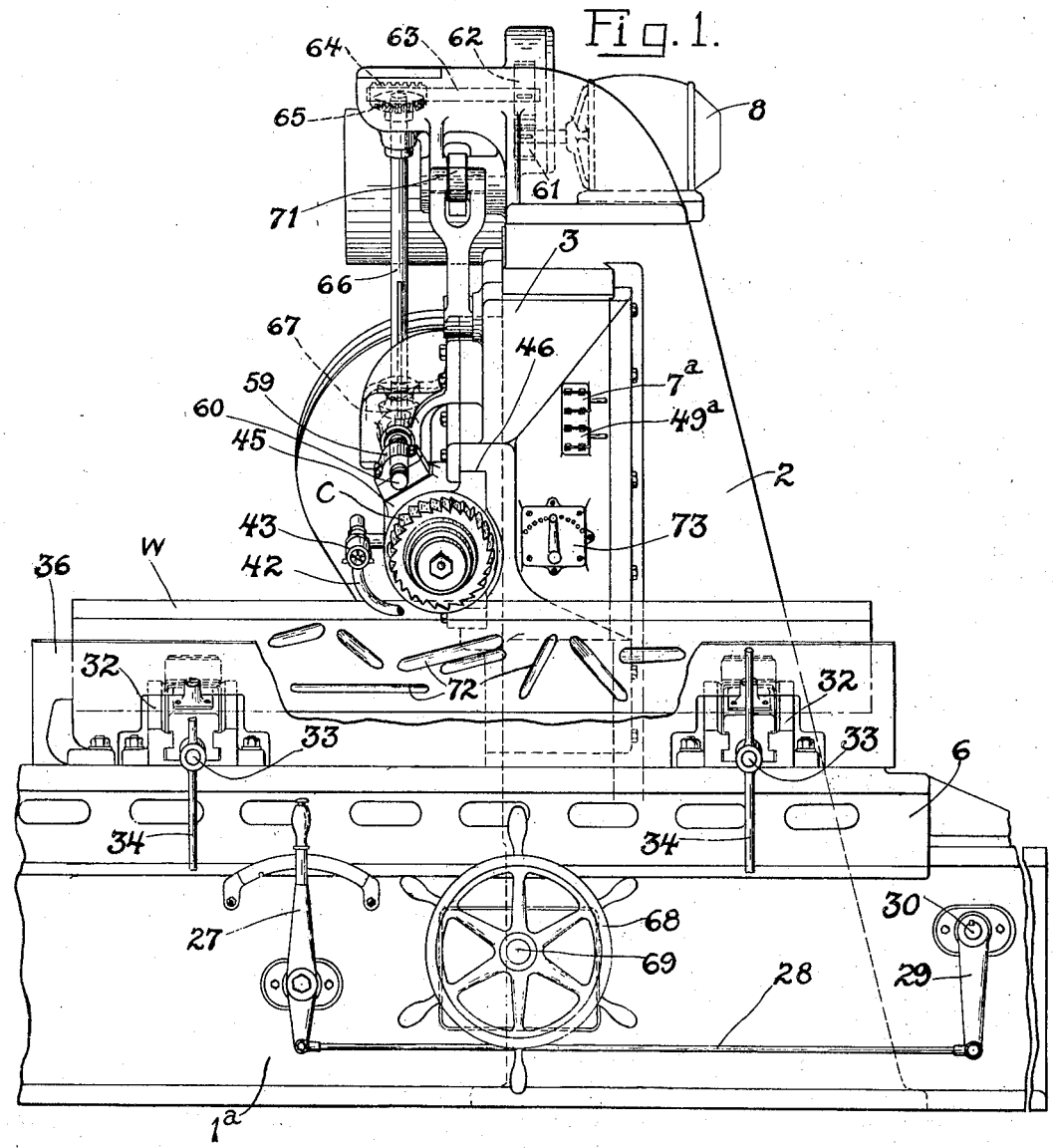
Figure 1 is a front elevation of a milling machine comprising the present invention.
Figure 2:
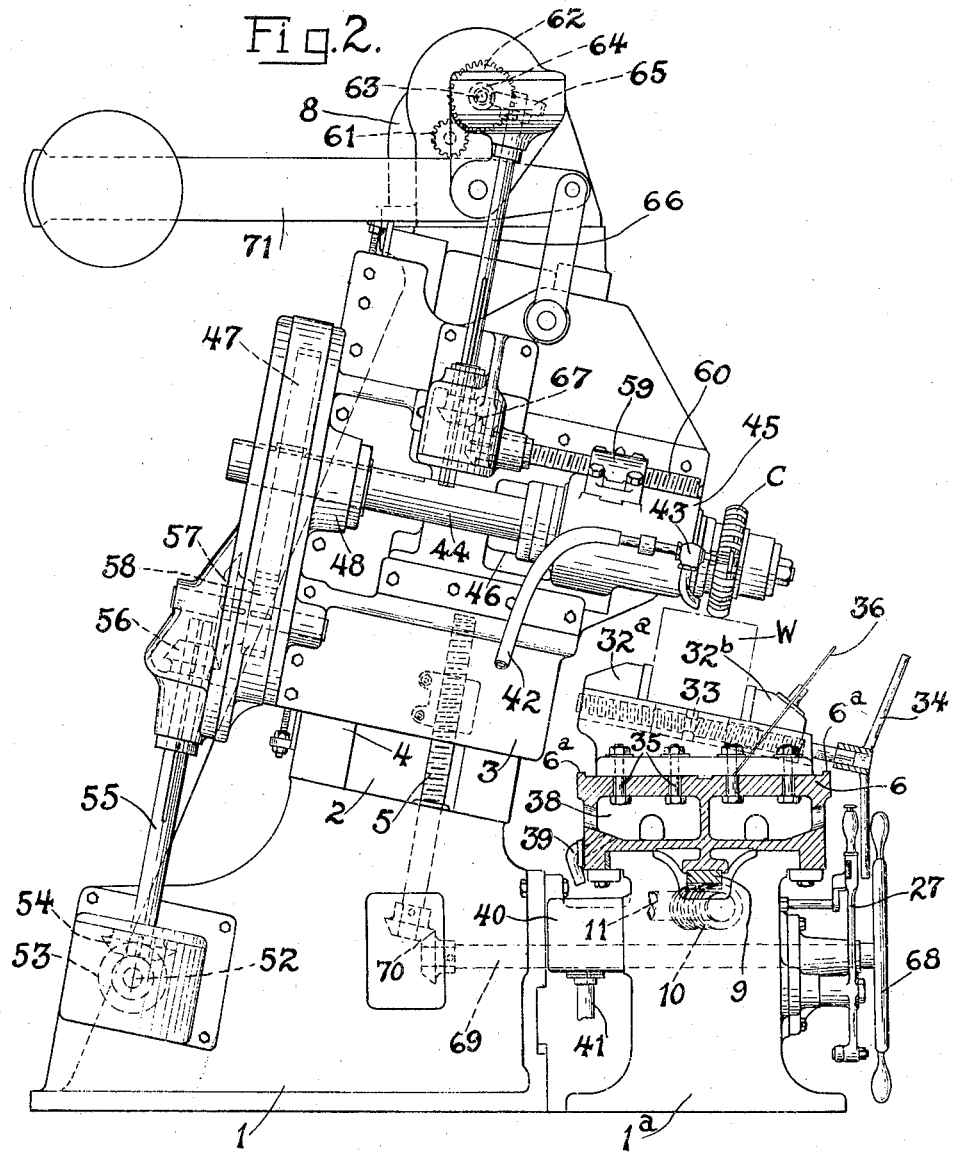
Fig. 2 is an end elevation thereof partially in section.
Figure 3:
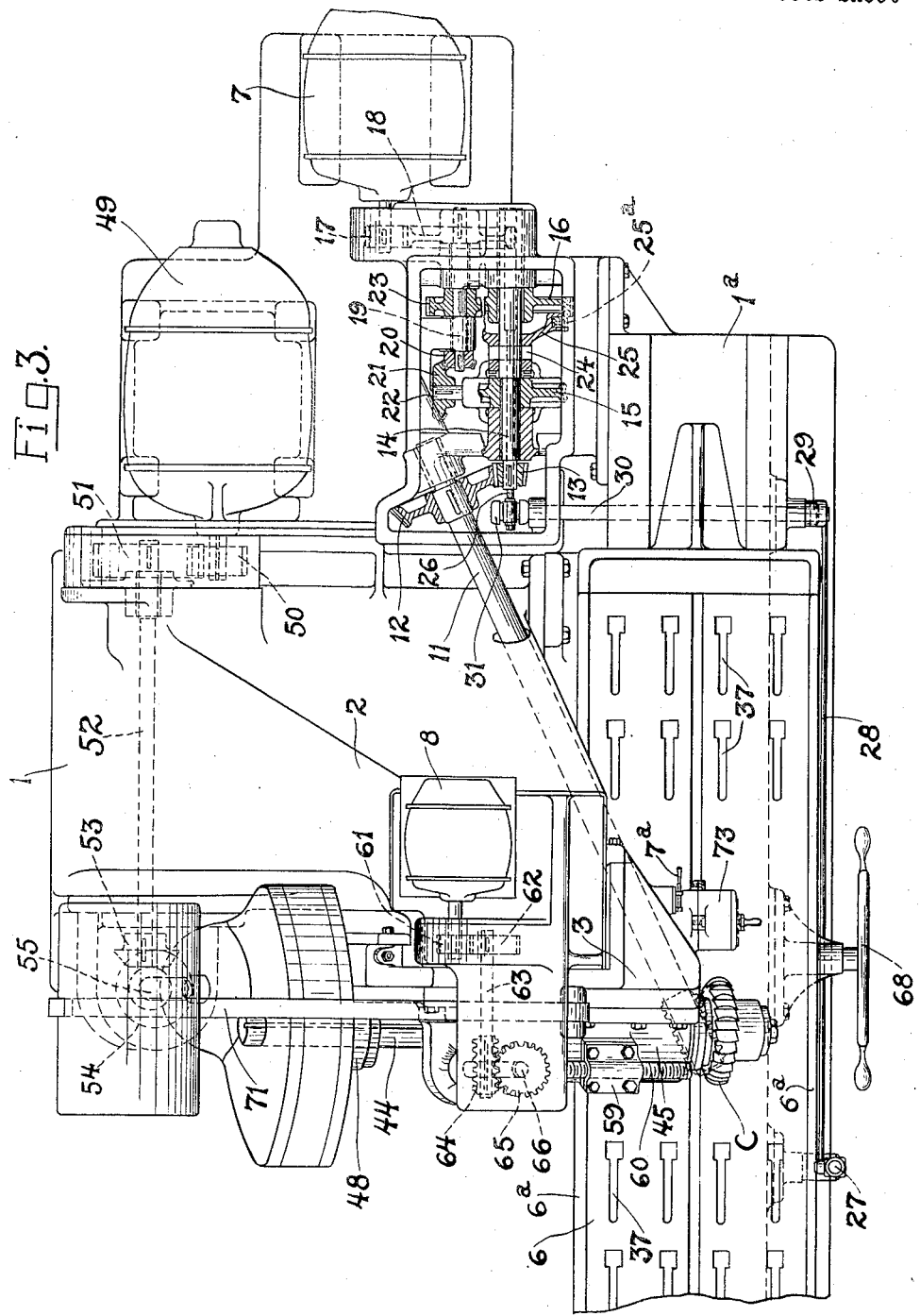
Fig. 3 is a plan view partially in section.

Referring particularly to Figs. 1, 2 and 3 of the drawings, 1 illustrates the bed of a milling machine from which rises an upright 2 preferably slightly inclined to the vertical. A tool supporting saddle 3 is mounted on a substantially vertical guideway 4 on the upright and may be moved up and down thereon by means of a screw 5. The bed 1, as illustrated, further comprises a portion 1ª secured thereto in any desired manner. A work support, as a table 6, is slidably mounted on the portion 1ª and is adapted to be reciprocated thereon by means of a motor 7. A motor 8 is also provided for giving the cutter an axial movement in conjunction with the other relative movements between the cutter and work whereby to perform the desired milling cuts in the work. The specific mechanism illustrated for performing these operations will now be described.

The table 6 is reciprocated from the motor 7 through the following mechanism: A rack 9 on the under side of the table is engaged by a spiral gear 10 on a shaft 11. A bevel gear 12 on the shaft 11 engages a bevel gear 13 on a tubular shaft 14. The shaft 14 is driven either from a worm gear 15 or from a spur gear 16, both loosely mounted thereon. The worm gear is adapted to be rotated slowly from the motor 7 through gears 17 and 18, shaft 19, bevel gears 20 and 21 and worm shaft 22 to move the table slowly in the cutting direction. The spur gear 16 is adapted to be rotated rapidly in the opposite direction from a gear 23 keyed to shaft 19. A clutch 24 splined to the shaft 14 is provided with teeth on one end thereof for engaging with corresponding teeth on the worm gear 15 and is provided on its opposite end with a friction cone 25 adapted to engage within a friction clutch flange 25ª on the gear 16. An operating rod 26 extends through the shaft 14 and engages the clutch 24 whereby the clutch may be shifted into driving engagement with either gear. A shifting handle 27 is provided at the front of the machine, such handle being operatively connected to the rod 26 through a connecting rod 28 and a crank arm 29 on a shaft 30 having a yoke 31 at its opposite end engaged with the rod 26. It will be noted that movement of the handle 27 one way is adapted to move the table slowly in the cutting direction and movement of the handle the opposite way is adapted to move the table rapidly in the opposite direction. The rotation of motor 7 is controlled by a switch 7ª.

The table is illustrated as provided with means, as a ridge 6ª, about its upper surface for preventing the overflow therefrom of cutting fluid and chips and with a pair of chucks 32 for supporting the work piece W. Each chuck comprises a pair of jaws 32ª and 32ᵇ engaged respectively by right and left hand screw threads on a screw rod 33, a capstan 34 being provided for rotating each screw rod. The chucks are secured to the table by means of bolts 35. It will be noted that the chucks are inclined forwardly of the table whereby the work thereon slopes toward the front of the machine. A baffle plate 36 is secured to the chuck jaws 32ᵇ and extends along the table for directing the chips and water, or other cutting fluid, to the middle of the table from whence they gravitate through the holes 37 in the table into the chamber 38 therein and through the port 39 into a screening receptacle 40. The water is permitted to drain therefrom through a waste pipe 41. During the operation of the machine fresh water is supplied to the cutter directly from a supply pipe 42 for washing away the chips and for cooling purposes, a throttle 43 being provided for controlling the flow thereof. It will be understood that the operator must accurately follow the cutter C along the grooves and cracks to be milled out of the work. The inclined arrangement of the work toward the operator better exposes the surface thereof to his view and the supply of water to the cutter and work in connection with the inclined arrangement of the work serves to keep the same free from chips which would obstruct the view of the operator.

One end of a substantially horizontal cutter spindle 44 is rotatably supported in a bearing 45 slidable in a guideway 46 on the saddle 3, the spindle at its other end being splined to a driving gear 47 in a bearing 48. The spindle is rotated from a motor 49 through a spur gear 50 on the motor shaft meshing with a gear 51 on a shaft 52 having a bevel gear 53 meshing with a bevel gear 54 on a substantially vertical shaft 55. A bevel gear 56 mounted in the saddle and splined to shaft 55 meshes with a bevel gear 57 connected with a spur gear 58 meshing with the aforesaid driving gear 47. The rotation of motor 49 is controlled by a switch 49ª.

A nut 59 on the bearing 45 engages a rotary screw 60 whereby the bearing is moved along its guideway 46 to move the spindle and cutter C axially. The screw 60 is driven in either direction at different speeds preferably by the aforementioned variable speed motor 8 mounted on the upright 2. The connection from the motor to the screw comprises a spur gear 61 on the motor shaft meshing with a gear 62 on a shaft 63 having on its other end a worm 64 meshing with a worm wheel 65 on a substantially vertical shaft 66. The shaft 66 and screw 60 are operatively connected through bevel gears 67.

As before stated, the saddle, with the spindle thereon, may be moved on its substantially vertical guideway 4 by means of a screw 5. A hand wheel 68 on a shaft 69 connected to screw 5 through bevel gears 70 is provided at the front of the machine for rotating the screw. The saddle is counterbalanced by a weighted lever 71 whereby the saddle may be moved with little effort.

In Fig. 1, one surface of the work piece W is illustrated as having been milled to remove the seams and cracks therein. It will be noted that the milled grooves 72 extend in various directions and to various depths, it being understood that the operator guides the cutter along the seams and to a depth sufficient to reach the bottoms thereof. The vertical movement of the cutter and saddle required for varying the depth of cut is relatively small and such operation can easily be performed by hand from the hand wheel 68, particularly since the saddle is counterbalanced. The feeding of the cutter longitudinally of the spindle across the work to follow the seams therein, however, requires more power and speed. During the cutting operation, the table is adapted to move at a constant speed and therefore the cutter must be moved transversely of the work at varying speeds to follow the different relatively angular seams. To accomplish this function, I provide the motor 8 with a controller 73 conveniently arranged whereby the operator may control the motor to feed the cutter axially in either direction at a proper speed to follow the desired line of cut.

The machine illustrated in Figs. 1, 2 and 3 is particularly adapted for milling relatively small billets of a limited width, such over-hung type of machine not being well adapted to mill wide billets. For this purpose of milling such wide billets, I have shown in Figs. 4 and 5 a similar machine slightly modified in certain respects. The table 80 and work supporting chucks 81 in this machine are of a construction substantially the same as those illustrated in Figs. 1 to 3. Also the table reciprocating mechanism is the same and the motor therefor is controlled by a switch 82. A pair of vertically extending uprights 83 and 84 are provided on opposite sides of the table and a cutter supporting rail 85 is mounted for vertical movement on such uprights. A vertical screw 86 in each upright engages the rail, such screws being adapted to be operated from a motor 87. The operative connection from the motor to the screws comprises a pinion 88 on the motor shaft meshing with a gear 89 on one end of a shaft 90 having on its other end a worm 91 engaging a worm wheel 92 on a shaft 93. The shaft 93 extends beneath the table and is operatively connected to the screws through bevel gears 94 and 95. A switch 87ª is provided for operating the motor 87 in either direction to raise or lower the rail 85.

A tool supporting saddle 96 is slidably mounted on the rail, a screw 97 serving to move the saddle therealong. A cutter spindle 98 is rotatably supported at the cutter end in the saddle and the opposite end is splined to a driving gear 99 corresponding to the driving gear 47 shown in Fig. 2, the spindle being driven from a motor in the same manner that the spindle shown in Fig. 2 is driven. A switch 100 is provided for controlling the rotation of the spindle driving motor.

The screw 97 is operated from a variable speed motor 101 controlled in the same manner as motor 8 shown in Fig. 1. The driving connection from the motor 101 to the screw comprises a pinion 102 on the motor shaft meshing with a gear 103 on one end of a shaft 104, having on its other end a bevel gear 105 engaging a bevel gear 106 on a shaft 107. The shaft 107 extends vertically upward and has splined thereto a worm 108 in engagement with a worm wheel 109 on the screw 97. A controller 110 is conveniently arranged on the upright 84 for controlling the motor 101 in the same manner heretofore described in reference to the machine shown in Figs. 1 to 3. It will be noted that the switches 82, 87ª and 100 and controller 110 are arranged conveniently to the operator whereby he may accurately control the several operating parts of the machine to perform the desired cutting operations.

The machine illustrated in Figs. 4 and 5 may be provided with a water supply 111, a baffle plate 112 for directing the water and chips, and a drain therefor in the same manner as illustrated and described in reference to Figs. 1 to 3.

What I claim is:

1. In a milling machine, the combination of a bed, a work table slidably mounted thereon, means for reciprocating the table, an upright adjacent the bed, a tool support carried by the upright, means for moving the support up and down on the upright, a tool spindle carried by the support and extending over the table in a direction slightly inclined to the horizontal, means for rotating the spindle, means for supporting a piece of work on the table in an inclined position corresponding to the spindle, power operated means for moving the spindle across the work table, and a controller device operative on the power operated means and under the control of the operator whereby the spindle may be fed transversely of the work table in either direction at different speeds during the said reciprocation.

2. In a milling machine, the combination of a bed, a work table slidably mounted thereon, means for reciprocating the table, an upright adjacent the bed, a tool support carried by the upright, means for moving the support up and down on the upright, a tool spindle carried by the support and extending over the table in a direction slightly inclined to the horizontal, means for rotating the spindle, means for supporting a piece of work on the table in an inclined position corresponding to the spindle, an electric motor for moving the spindle across the work table, and a controller for the motor whereby the operator may feed the spindle transversely of the work table at different speeds in either direction during the said reciprocation.

3. In a milling machine, the combination of a bed, a work table slidably mounted thereon, an upright on the bed at one side of the table, a tool saddle carried by the upright solely at such side of the table, a screw for moving the saddle up and down on the upright, a tool spindle carried by the saddle and extending over the table in a direction slightly inclined to the horizontal, means for rotating the spindle, means for supporting a piece of work on the table in an inclined position corresponding to the spindle, power operated means for moving the spindle across the work table, and a controller device operative on the power operated means and under the control of the operator whereby the spindle may be fed transversely of the work table in either direction during the said reciprocation.

4. In a milling machine, the combination of a bed, a work table slidably mounted thereon, means for reciprocating the table, an upright on the bed slightly inclined to the vertical, a guideway extending upwardly on the upright, a saddle slidably mounted on the guideway, means for moving the saddle on the guideway, a rotary tool spindle carried by the saddle and extending over the table in a direction slightly inclined to the horizontal, means for rotating the spindle, means for supporting a piece of work on the table in an inclined position corresponding to the spindle, an electric motor for moving the spindle across the work table, and a controller for the motor whereby the operator may feed the spindle transversely of the work table at different speeds in either direction during the said reciprocation.

5. In a metal working machine, the combination of a bed, horizontal ways thereon, a work table slidably mounted on the ways, means for supporting a piece of work on the table with the upper surface thereof slightly inclined to the horizontal, and a baffle plate extending along the table adjacent the lower side of the work thereon, the plate being adapted to direct the flow of cutting fluid and chips.

6. In a metal working machine, the combination of a bed, a laterally and longitudinally horizontally extending work table slidably mounted thereon, means for supporting a piece of work on the table with the upper surface thereof slightly inclined to the horizontal, and a baffle plate extending along the table adjacent the lower side of the work thereon, the plate being adapted to direct the flow of cutting fluid and chips.

7. In a metal working machine, the combination of a bed, horizontal ways thereon, a work table slidably mounted on the ways, means for supporting a piece of work on the table with the upper surface thereof slightly inclined to the horizontal, a rotary tool spindle, means for supporting and feeding the spindle over the table in a correspondingly inclined position, means for supplying a cutting fluid to the tool and work, and a baffle plate extending along the table adjacent the lower side of the work thereon, the plate being adapted to direct the flow of cutting fluid and chips.

In testimony whereof, I hereto affix my signature.

WILLIAM J. HAGMAN.